Dec. 28, 1965 W. H. VOGEL 3,225,511
CIRCULAR PRESCORING AND TRANSFER APPARATUS
Filed April 16, 1963 4 Sheets-Sheet 1
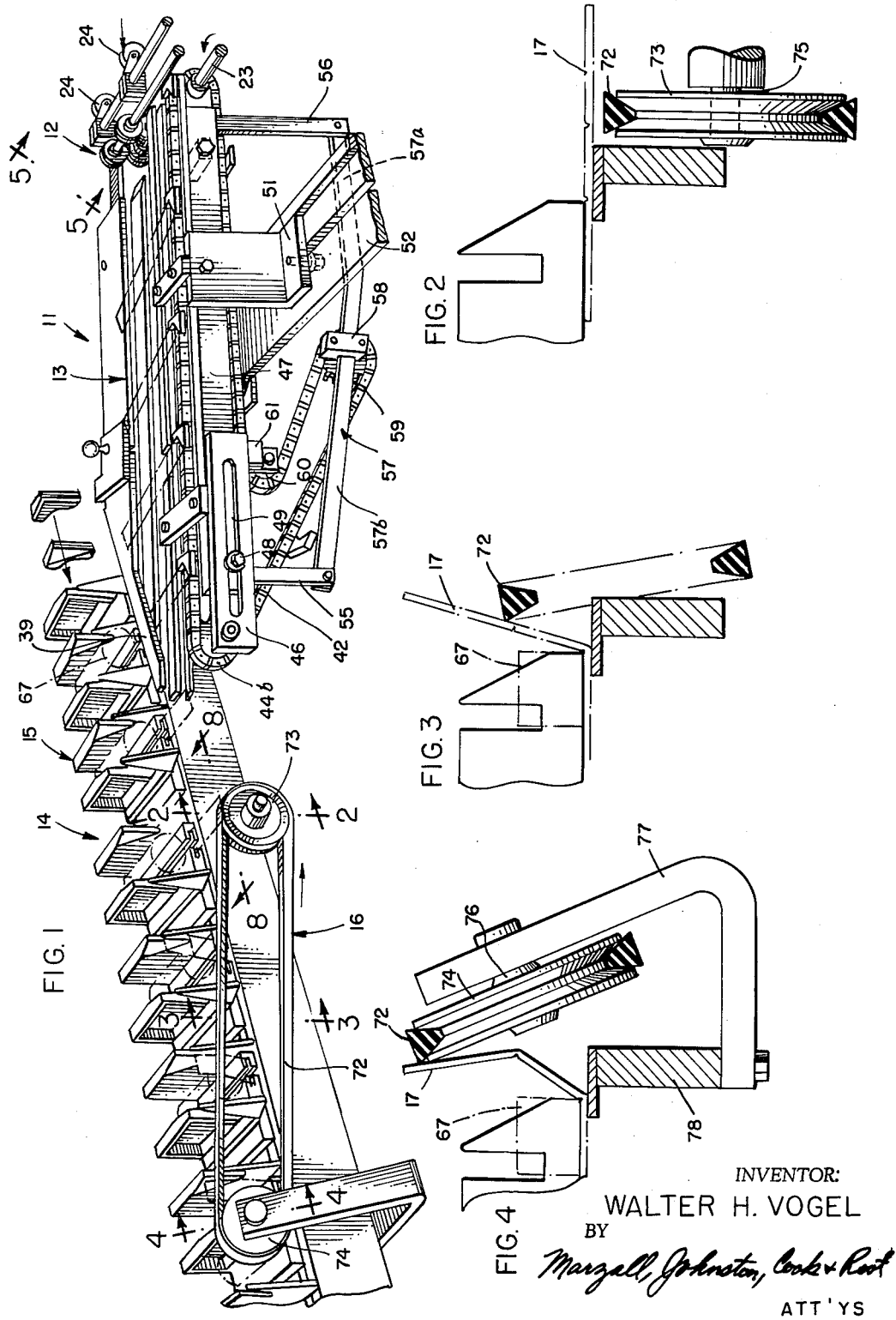
INVENTOR:
WALTER H. VOGEL
BY
Marzall, Johnston, Cook & Root
ATT'YS

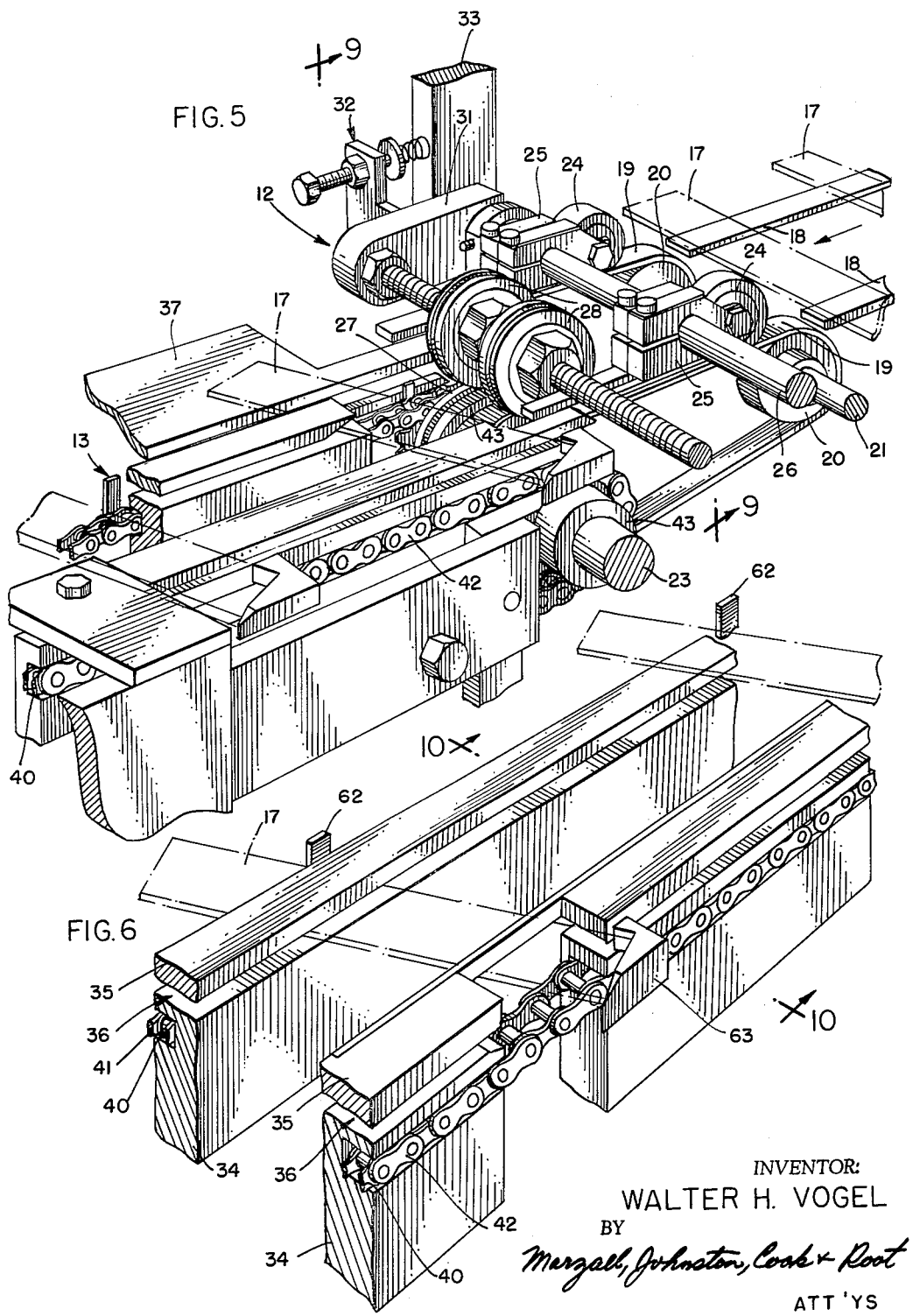

INVENTOR:
WALTER H. VOGEL
BY
Mangall, Johnston, Cook+Root
ATT'YS

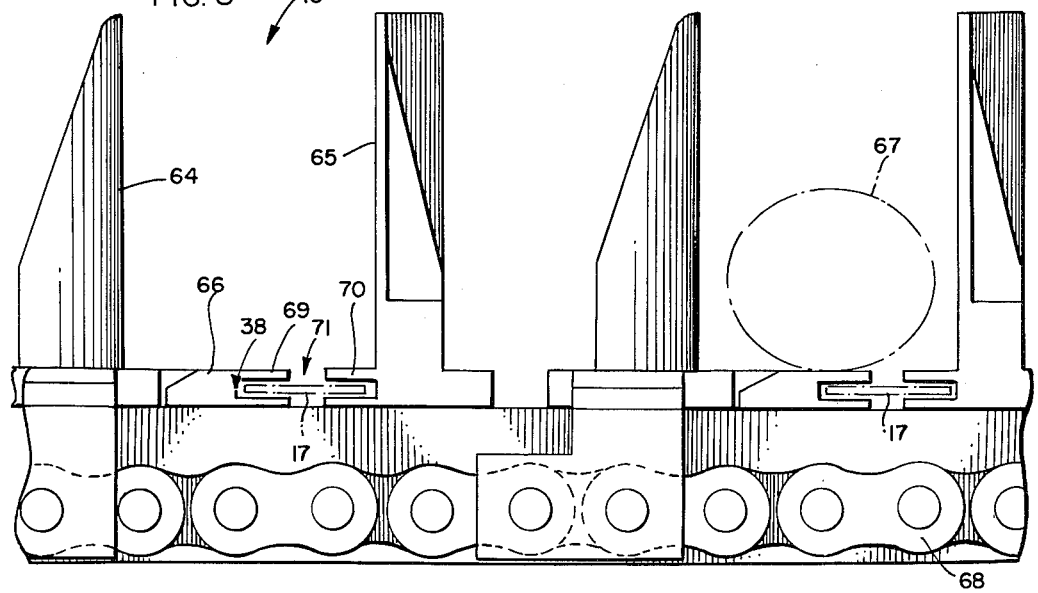
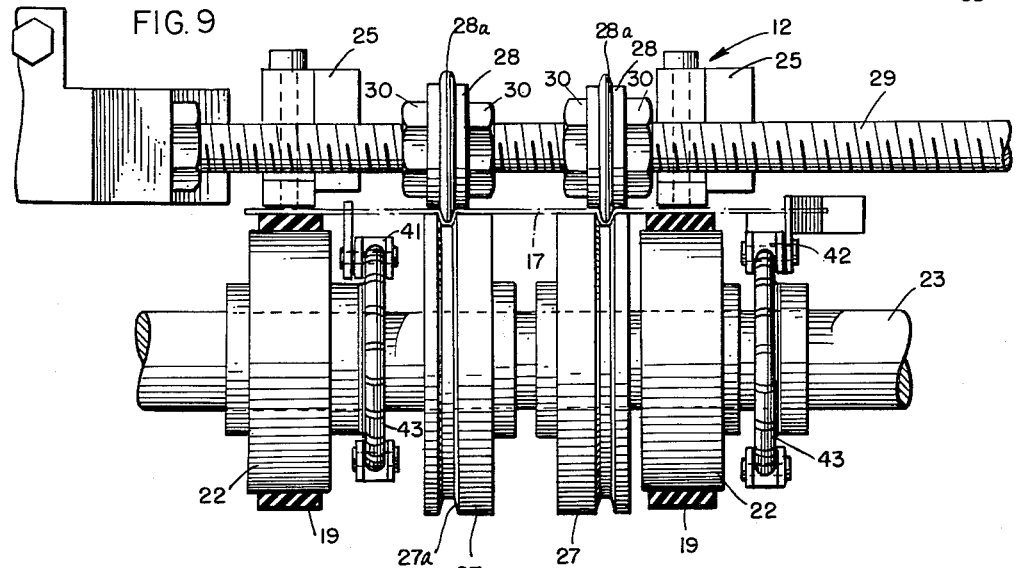
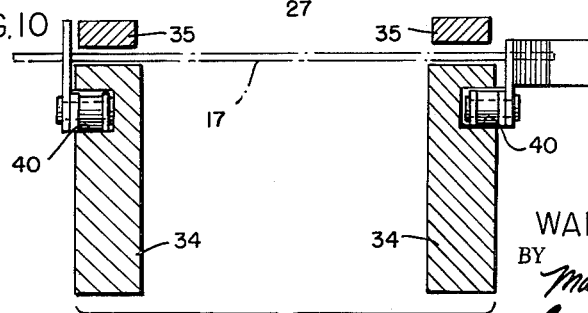

United States Patent Office 3,225,511
Patented Dec. 28, 1965

3,225,511
CIRCULAR PRESCORING AND TRANSFER
APPARATUS
Walter H. Vogel, 215 Chamberlain Drive, Barrington, Ill.
Filed Apr. 16, 1963, Ser. No. 273,488
8 Claims. (Cl. 53—113)

This invention relates in general to packaging machines, and more particularly to apparatus for handling a circular to be inserted into a package with an article. Still more particularly, the present invention relates to apparatus for prescoring a circular on transferring the circular to an article conveyor and for folding the circular over the article prior to insertion of the article and folded circular into a carton or box.

The apparatus of the invention, in prescoring a circular, enables the circular to be easily folded on an article and eliminates the necessity of having mechanical folding means for arranging the circular with the article. Mating beaded and grooved rollers serve to prescore the circulars, while the circular transfer conveyor is positioned at an angle to the article conveyor. The circulars are angularly arranged on the circular transfer conveyor so that they may be directly inserted into the article conveyor. Means is provided along the article conveyor to fold the circular over onto the article. Thereafter, the articles and circular are inserted together in a carton or box. The circular herein may be one having single or multiple thicknesses. Where a circular is composed of multiple thicknesses, it will be appreciated that suitable folding means for folding the circular will be provided ahead of the prescoring device of the aparatus.

The apparatus for prescoring and transferring the circular is preferably adjustable so that the scores may be dimensionally positioned wherever desirable along the circular, and the apparatus is also preferably adjustable to handle various sizes of circulars. Moreover, the transfer apparatus is preferably adjustable so that the circular may be inserted any predetermined distance into the article conveyor.

It is therefore an object of the invention to provide an apparatus for prescoring a circular, inserting the circular into an article conveyor, and folding the circular over an article prior to insertion of the article and circular into a carton or box.

A further object of this invention resides in the provision of apparatus for prescoring a circular and transferring the circular to buckets on an article conveyor in a continuous motion without the use of reciprocating parts, wherein the mechanism for obtaining the transfer is adjustable to handle various sizes of circulars and to insert the circulars into the buckets on the conveyor within a range of predetermined distances.

Other objects, features, and advantages of the invention will be apparent from the following detailed disclosure, taken in conjunction with the accompanying sheets of drawings, wherein like reference numerals refer to like parts, in which:

FIG. 1 is a perspective view of the prescoring and transferring apparatus of the present invention and showing it in relation to an article conveyor, and also showing the means for folding the circular over the article in the article conveyor;

FIGS. 2, 3 and 4 are respectively sectional views taken substantially along lines 2—2, 3—3 and 4—4 of FIG. 1 for illustrating the folding of the circular in the article conveyor;

FIG. 5 is an enlarged perspective view of the prescoring apparatus and viewing particularly along line 5—5 of FIG. 1;

FIG. 6 is an enlarged detail view of a portion of the transfer apparatus;

FIG. 8 is an enlarged view of the buckets on the article conveyor and taken particularly along line 8—8 of FIG. 1;

FIG. 9 is a transverse sectional view taken through the prescoring apparatus, and taken substantially along line 9—9 of FIG. 5; and FIG. 10 is a sectional view taken substantially along line 10—10 of FIG. 6.

Figure 7:
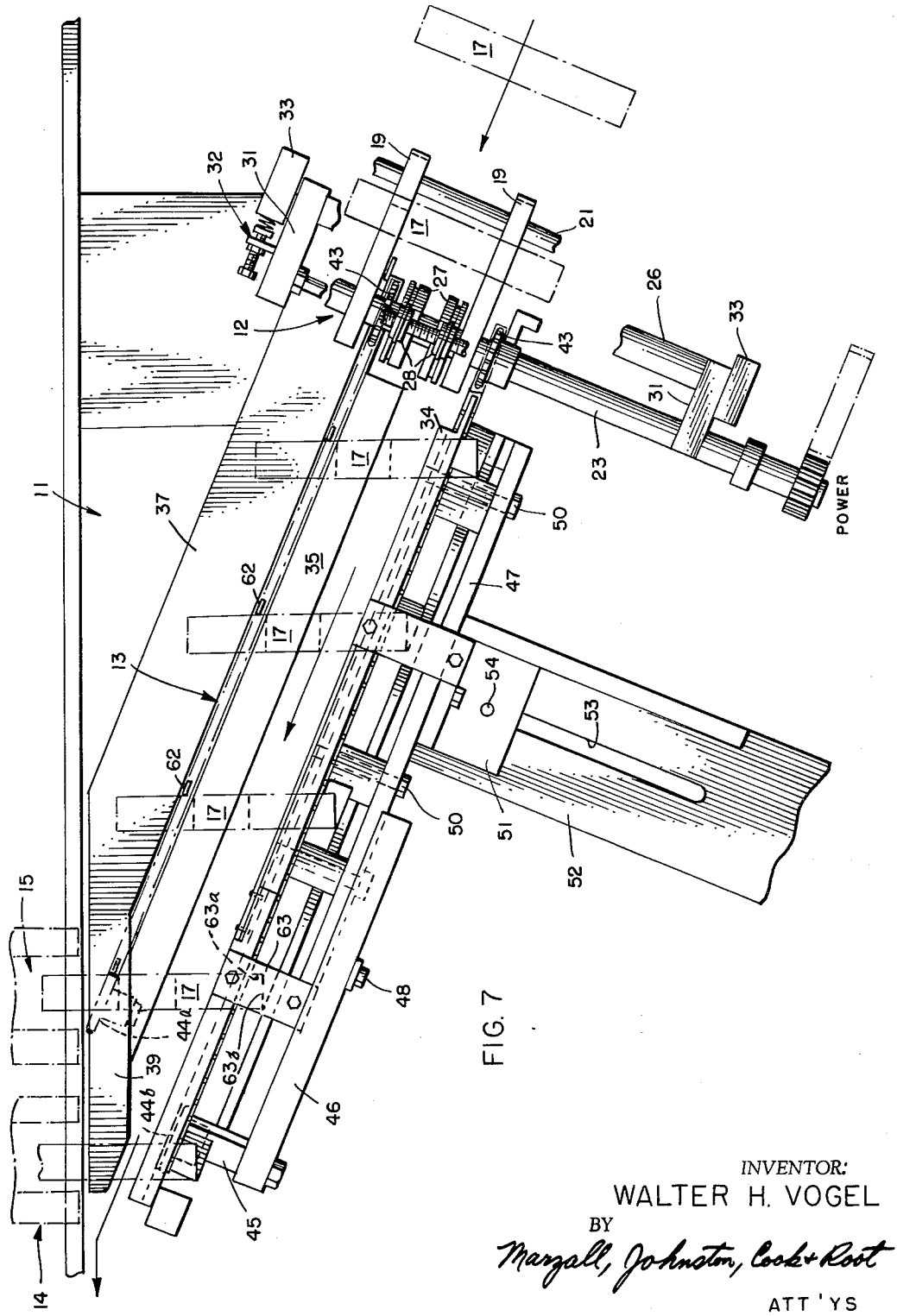
FIG. 7 is a top plan view of the circular prescoring and transfer apparatus of the present invention.

Referring now to the drawings, and particularly to FIG. 1, the circular prescoring and transfer apparatus of the present invention is generally indicated by the numeral 11, and includes a circular prescoring mechanism 12 and a circular feed and transfer conveyor 13. The circular prescoring and transfer apparatus 11 is angularly arranged to an article conveyor 14 having a plurality of spaced article buckets 15. Circulars are delivered to the circular prescoring mechanism 12 wherein scores are placed in the circular, and thereafter the circulars are arranged angularly with respect to the path of movement on the circular feed conveyor 13 and subsequently inserted into the buckets 15 on the article conveyor 14 by the circular feed conveyor 13. It should be appreciated that the circular could be inserted along side of the article or under the article if so desired. The article is dropped in the bucket after the circular is inserted when the circular is placed directly under the article. The articles about which the circular may be folded will have already been placed in the buckets 15 on the article conveyor, and thereafter a circular fold-over device generally designated by the numeral 16 will operate to fold the circular about the article in the buckets. Then the articles and circulars may be inserted together into a box or carton.

As seen in FIG. 5, circulars 17 are fed to the inlet end of the circular prescore and transfer apparatus along guide rails 18 by any suitable means such as a pusher mechanism. The circulars are received from a suitable source of supply and delivered one at a time. From the supporting rails 18, the circulars are delivered onto a pair of transversely spaced endless belts 19 that are trained around idler pulleys 20 mounted on an idler shaft 21. The belts 19 are further trained around drive pulleys 22 mounted on a drive shaft 23. Rubber surfaced hold-down rollers 24, FIG. 5, are mounted above the belts 19 to coact therewith in providing frictional engagement between the belts and the circulars and to hold the circulars on the belts. Thus, positive feeding is provided to the prescoring device. The rollers 24 are mounted on brackets 25 carried on a transversely extending supporting rod 26 and the rollers are preferably spring biased against the belts 19. The brackets 25 may be adjustably moved along the support rod 26 when adjusting the machine for various sizes of circulars. Thus the conveying belts 19 advance the circular 17 to the circular prescoring mechanism 12.

Referring now to FIGS. 5, 7 and 9, the circular prescoring mechanism 12 includes two par of coacting prescoring rollers, each pair of which includes a lower driven roller 27 and an upper idler roller 28. The lower rollers 27 are provided with an annular groove 27a while the upper idler rollers 28 are provided with an annular bead 28a, wherein the bead 28a mates with the groove 27a and interengages to define a score in the circular when it is driven between the rollers. The lower rollers 27 are fixed to the drive shaft 23, while the upper rollers 28 are idly mounted on a threaded shaft 29. Nuts 30 are provided at each side of the upper rollers 28 for purposes of fixing the rollers at a predetermined location along the threaded shaft 29. Likewise, the lower rollers 27 may be adjustably located along the drive shaft 23. Thus the rollers may be moved therealong when adjusting the prescoring mechanism for changing the point of prescoring on a circular. It should be appreciated that one or more sets of prescoring rollers may be provided for the prescoring operation.

The threaded shaft 29 is secured at opposite ends to pivotal brackets 31 that may be pivotally mounted on the supporting rod 26 and preferably biased downwardly by means of an adjustable bracket and spring arrangement 32. The supporting rod 26 may be supported at opposite ends by fixed posts 33, FIGS. 5 and 7. The upper and lower rollers, being adjustable along their respective shafts, permit the accommodation of various sizes of circulars and various scoring arrangements. Further, the prescoring rollers may be externally roughened or knurled at any particular desired location in order to enhance the gripping power thereof when receiving the circulars for prescoring operations.

After the circulars leave the prescoring mechanism, they are delivered to a trackway of the circular feed conveyor 13, which trackway is defined by spaced apart lower rails 34, and upper guide bars 35 arranged in superimposed relation above the lower rails to define therebetween the trackway 36. A further hold-down plate 37 is arranged over the ends of the circulars adjacent to the article conveyor 14 to accurately guide this end which must be properly and precisely inserted into a slot in the bucket conveyor as identified generally by the numeral 38 in FIG. 8. As seen in FIG. 7, the guide plate 37 extends angularly relative to the article conveyor 14 and carries at its delivery end an extension 39 that extends parallel to the article conveyor 14.

Each lower rail 34 is provided with a chain guiding and supporting slot 40, FIGS. 6 and 10, along the non-facing sides for receiving therein endless chains. The chain guide slot 40 on the lower rail 34 immediately adjacent to the article conveyor 14 receives an endless chain 41, while the other chain guide slot receives an endless chain 42. The endless chains 41 and 42 are trained at one end about drive sprockets 43 fixed to the drive shaft 23, and at the other end about idler sprockets 44a and 44b. The idler sprocket 44a is suitably mounted along the lower rail 34 adjacent the article conveyor 14. The idler sprocket 44b is mounted on a stub shaft 45 secured to an adjustably movable supporting arm 46, FIGS. 1 and 7.

As seen more clearly in FIG. 7, the supporting arm 46 is adjustably mounted along a bar 47 by means of a bolt 48 that extends through an elongated slot 49 (FIG. 1) of the supporting arm. The bar 47 is secured in laterally spaced relationship to the lower rail 34 remote from the article conveyor 14 by means of suitable fasteners and spacers 50. The bar 47 is in turn mounted at the upper end of an angle shaped bracket 51 that is supported on and secured to a fixed frame member 52. An elongated slot 53 is provided in the frame member 52, and a bolt 54 extends through the slot and is secured to the lower end of the bracket 51. Thus the entire side of the circular feed conveyor that is remote from the article conveyor 14 may be moved toward and away from the article conveyor along the frame member 52 to adjust the conveyor for handling various sizes of circulars.

Referring to FIG. 1, a pair of longitudinally spaced hangers 55 and 56 are suspended from the bar 47 and have at their lower ends connected thereto a bent bar 57 having a horizontally extending portion 57a and an upwardly inclined portion 57b. A sprocket mounting bracket 58 is adjustably fixed along the angularly arranged portion 57b of the bent bar 57, and arranged to carry an idler sprocket 59 over which the lower run of the chain 42 is trained. The chain 42 is additionally trained about a fixed idler sprocket 60 that is suspended from a support 61 hanging down from the bar 47. Thus by loosening the sprocket mount 58 so that it is movable along the bar 57b, and the bolt 48 so that the supporting arm 46 is movable along the bar 47, the upper run length of the chain 42 may be shortened or lengthened. This serves to adjust the depth of push and positioning of the circular into the slot 38 of the buckets 15 on the article conveyor 14 as will be more clearly hereinafter explained.

The chain 41 is provided with a plurality of pusher lugs 62 spaced therealong and for engaging the trailing edge of the circulars at one end thereof, while the chain 42 is provided with a plurality of pushing blocks 63 arranged therealong for pushing the other end of the circulars. Each pusher block includes a pushing surface 63a which engages the trailing edge of each circular, and a pushing face 63b which engages one end of each circular and serves to push the circulars into the buckets on the article conveyor. Thus each pusher block serves to push each circular along its longitudinal and transverse axes. By lengthening or shortening the upper run of the chain 42, it will be appreciated that the position of last engagement with each circular by the pusher blocks will be changed so that the circulars may be pushed further into or left further out of the buckets on the article conveyor.

As can be best seen in FIG. 7, each circular extends perpendicular to the longitudinal axis of the feed conveyor 13 as it approaches the inlet end of the feed conveyor and the circular prescoring mechanism 12. The circular remains in this position until thereafter it has passed through the circular prescoring mechanism 12 and at that time is picked up first by one of the pusher lugs 62 on the chain 41. The pusher lugs 62 on the chain 41 are arranged in staggered relation with respect to the pusher block 63 on the chain 42. However, the pusher lugs 62 and the pusher blocks 63 are arranged so that they push the circulars along the circular feed conveyor 13 wherein the longitudinal axes of the circulars extend perpendicular to the longitudinal axis of the article conveyor 14. It should be appreciated that the pusher lugs and pusher blocks being mounted on the chains 41 and 42 are synchronized and that they are driven by sprockets mounted on the common drive shaft 23. Moreover, the prescoring rollers are similarly synchronized with the pusher lugs and pusher blocks since the lower prescoring rollers 27 are mounted on the drive shaft 23. Similarly, the feed belts 19 are synchronized with the movement of the pusher lugs, pusher blocks and the prescoring rollers since the drive pulleys 22 are similarly mounted on the drive shaft 23. Suitable means may be provided for driving the drive shaft 23.

Referring now to FIG. 8, it is seen that each bucket 15 includes a forward wall 64, a rearward wall 65, and a bottom 66 upon which an article 67 may be placed. The forward and rearward walls 64 and 65 are preferably adjustable so as to accommodate various sizes of articles, and the buckets are attached to one or more chains 68 which drive them along a rectilinear path. Just below the bottom 66, the circular slot 38 is arranged to receive a circular 17 from the circular feed conveyor 13. The slot 38 is defined by facing U-shaped openings in spaced bucket parts 69 and 70 so that a vertical slot 71 is provided to permit movement of a pusher to the bucket when discharging the circular and article from the bucket and inserting same into a container or box on a container conveyor.

Referring now to FIGS. 1–4, the circular fold-over device 16 functions to fold the end of the circular extending outwardly from the buckets 15 upwardly and in some cases also over the articles in the buckets. It should be appreciated that the circulars are not inserted fully into each of the buckets but a portion is left extending laterally thereof so that it may be folded upwardly and over the articles in the buckets. This fold-over device includes an endless belt 72 of any desired shape trained over spaced idler pulleys 73 and 74. The idler pulley 73 is mounted on a horizontally extending shaft 75 that positions the pulley and belt below the circular 17 as particularly shown in FIG. 2. The pulley 74 is mounted on a shaft 76 extending at an incline relative to the horizontal and positioned above the plane of the circular 17 so that the belt 72 operates to bend over the loose end of the circular as shown particularly in FIGS. 3 and 4. The shaft 76 is mounted on an angularly shaped supporting member 77 carried by the frame 78 of the article conveyor. Further a stationary guide means may be provided to additionally fold over the free end of the circular so that it is folded completely over the end of an article arranged in the buckets of the article conveyor.

It should be further appreciated that the speed of the circular feed conveyor is synchronized with the speed of the article conveyor so that the circulars will be properly transferred into the circular slot on the article conveyor.

It will be understood that modifications and variations may be effected without departing from the scope of the novel concepts of the present invention, but it is understood that this application is to be limited only by the scope of the appended claims.

The invention is hereby claimed as follows:

1. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a pair of endless conveying members having a plurality of pairs of spaced lugs thereon for pushing the circulars therealong, one lug of each pair being advanced ahead of the other lug to feed the circulars at an angle to the longitudinal axis of said conveying members and parallel to the buckets, one of said lugs of each pair having means for pushing one end of each circular into an open end of a bucket, and means for prescoring said circulars arranged at the inlet end of the apparatus comprising a pair of coacting rollers, one of said coacting rollers having an annular groove and the other of said coacting rollers having an annular bead mating with said groove, both of said rollers having coacting engaging circular drive faces, and means for resiliently mounting one of said rollers to be continually urged against the other of said rollers.

2. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movement and align same for endwise insertion into said buckets, and one of said lugs having means for pushing the circular into said bucket.

3. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movement and align same for endwise insertion into said buckets, one of said lugs having means for pushing the circular into said bucket, and means for synchronously driving said pairs of lugs with said buckets.

4. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movement and align same for endwise insertion into said buckets, one of said lugs having means for pushing the circular into said bucket, means for synchronously driving said pairs of lugs with said buckets, and power driven belt means for folding upward the end of each circular inserted into said buckets.

5. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movement and align same for endwise insertion into said buckets, one of said lugs having means for pushing the circular into said bucket, means for synchronuosly driving said pairs of lugs with said buckets, and power driven belt means for folding upward the end of each circular inserted into said buckets, said belt having its circular engaging run extending at an incline relative to the horizontally extending buckets.

6. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movemnet and align same for endwise insertion into said buckets, one of said lugs having means for pushing the circular into said bucket, and means for prescoring said circular arranged at the inlet of the apparatus comprising a pair of coacting rollers, one of said coacting rollers having an annular groove and the other of said coacting rollers having an annular bead mating with said groove, and both of said rollers having coacting engaging circular drive faces.

7. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movement and align same for endwise insertion into said buckets, one of said lugs having means for pushing the circular into said bucket, and means for adjusting the distance each circular is inserted into the buckets.

8. In combination with a packaging machine for inserting articles into cartons wherein said packaging machine includes an article conveyor having spaced buckets extending transverse the conveyor and open at one end thereof, a device for feeding circulars one at a time and apparatus for receiving the circulars and transferring same into the open ends of the buckets on the article conveyor, said apparatus comprising a horizontal circular conveying surface, a circular transfer conveyor for moving the circulars along said surface, aligning the circulars and inserting same into the buckets, said conveyor including a pair of endless parallel chains extending at an incline to said article conveyor, a plurality of pairs of lugs carried by said chains for moving the circulars along the conveying surface, one of said lugs of each pair being advanced ahead of the other of said lugs of each pair to incline each circular relative to the direction of movement and align same for endwise insertion into said buckets, one of said lugs having means for pushing the circular into said bucket, and means for adjusting the spacing between said chains to accommodate different sized circulars.

References Cited by the Examiner
UNITED STATES PATENTS 2,133,248 10/1938 Jones _____ 53—251 X
2,379,127 6/1945 Werner _____ 93—58.1 X FRANK E. BAILEY, *Primary Examiner.*

P. H. POHL, *Assistant Examiner.*